(12) United States Patent
Rossi et al.

(10) Patent No.: US 11,550,455 B2
(45) Date of Patent: Jan. 10, 2023

(54) LOCALIZED VISUAL GRAPH FILTERS FOR COMPLEX GRAPH QUERIES

(71) Applicant: Palo Alto Research Center Incorporated, Palo Alto, CA (US)

(72) Inventors: Ryan A. Rossi, Mountain View, CA (US); Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 829 days.

(21) Appl. No.: 15/175,751

(22) Filed: Jun. 7, 2016

(65) Prior Publication Data
US 2017/0351406 A1 Dec. 7, 2017

(51) Int. Cl.
| | |
|---|---|
| *G06F 3/04842* | (2022.01) |
| *G06F 16/901* | (2019.01) |
| *G06F 3/0482* | (2013.01) |
| *G06F 3/04847* | (2022.01) |
| *G06T 11/20* | (2006.01) |
| *G06F 16/2455* | (2019.01) |
| *G06F 3/033* | (2013.01) |

(52) U.S. Cl.
CPC ......... *G06F 3/04842* (2013.01); *G06F 3/033* (2013.01); *G06F 3/0482* (2013.01); *G06F 3/04847* (2013.01); *G06F 16/2455* (2019.01); *G06F 16/9024* (2019.01); *G06T 11/206* (2013.01); *G06T 2210/21* (2013.01)

(58) Field of Classification Search
CPC ......... G06F 17/30554; G06F 17/30572; G06F 17/30651; G06F 17/30696; G06F 17/30716; G06F 17/30719; G06F 17/30941; G06F 17/30958; G06F 17/30961; G06F 17/30973; G06F 17/30991; G06F 17/30994; G06F 3/048; G06F 16/2455–24568; G06F 16/9024; G06F 3/0482; G06F 3/04842; G06F 3/04847; G06F 3/033–0395; G06T 11/206; G06T 2210/21; G06Q 50/01
See application file for complete search history.

(56) References Cited

U.S. PATENT DOCUMENTS

| | | | | |
|---|---|---|---|---|
| 5,361,340 | A | * 11/1994 | Kelly | ............... G06F 12/0831 |
| | | | | 711/146 |
| 2009/0064053 | A1 | * 3/2009 | Crawford | ............ G06F 3/04845 |
| | | | | 715/854 |

(Continued)

OTHER PUBLICATIONS

GCF LearnFree, www.gcflearnfree.org/windowsxp/working-with-windows-explorer/1/.*

(Continued)

*Primary Examiner* — Liang Y Li
(74) *Attorney, Agent, or Firm* — Burns & Levinson LLP; Steven M. Mills (57) ABSTRACT

Embodiments of the present invention provide a system for querying a graph based on applying filters to a visual representation of the graph. The system allows complicated graph query operations to be performed with ease visually. During operation, the system obtains data indicating vertices and edges of a graph. The system displays a visual representation of the graph for a user. The system receives, from the user, a command defining a local graph filter comprising a region in the visual representation. The system then filters a representation of the graph, and stores the filtered representation.

20 Claims, 9 Drawing Sheets

(56) References Cited

U.S. PATENT DOCUMENTS

| | | | | |
|---|---|---|---|---|
| 2013/0125057 A1* | 5/2013 | Kashik | ............... | G06F 16/904 |
| | | | | 715/852 |
| 2013/0282889 A1* | 10/2013 | Tito | ............... | H04L 43/00 |
| | | | | 709/224 |
| 2014/0043325 A1* | 2/2014 | Ruble | ............... | G06F 3/04815 |
| | | | | 345/419 |
| 2017/0111237 A1* | 4/2017 | Shah | ............... | G06F 3/0481 |

OTHER PUBLICATIONS

Harley, Aurora. "Slider Design: Rules of Thumb." Nielsen Norman Group, Sep. 13, 2015, www.nngroup.com/articles/gui-slider-controls/.*

Data J Lab. Gelphi Tutorial: Visualizing Facebook Network. YouTube. Sep. 30, 2013. https://www.youtube.com/watch?v=kbLFMObmLNQ (Year: 2013).*

Cherven, Ken. Mastering Gephi Network Realization. Packt Publishing. Jan. 2015. (Year: 2015).*

* cited by examiner

Constraint: 2 ≤ Degree ≤ 3

FIG. 9

LOCALIZED VISUAL GRAPH FILTERS FOR COMPLEX GRAPH QUERIES

BACKGROUND

Field

The present disclosure relates to graph querying. More specifically, this disclosure relates to a method and system for querying a graph based on applying filters to a visual representation of the graph.

Related Art

Graphs are representations of edges, also known as links or connections, that connect a set of vertices, also known as nodes. Graphs are important for many applications, including analysis of large data sets such as social networks or consumer-product relationships, and applications in biology and computer science. Many graph-computation methods exist for various purposes, such as predicting relationships and making recommendations. However, large-scale graphs are difficult and time-consuming to analyze, understand, and model.

Because of the importance of graphs, various methods are used to visualize or display graphs, as well as to perform queries on graphs. The problem of querying a graph can be solved by using low and high-level programming languages and sophisticated graph and network packages based on traditional graph algorithms, etc. The user or data scientist often needs to write a script to select nodes and edges using some property of interest. Some previous work has allowed nodes to be selected visually. However, the existing approaches can be time-consuming, not easy to use/intuitive, and not flexible for complex queries.

SUMMARY

One embodiment of the present invention provides a system and method for querying a graph. During operation, the system obtains a data structure indicating vertices and edges of a graph. The system may display, for a user, a visual representation of the graph. The system may then receive, from the user, a command defining a local graph filter comprising a region in the visual representation of the graph. The system may then filter a representation of the graph to select a subset of vertices visually represented within the region, and edges connecting vertices in the subset. The system may then store the selected vertices and edges of the filtered representation of the graph in a non-transitory storage medium.

In a variation on this embodiment, the system may receive, from the user, an additional local graph filter comprising an additional region in the visual representation of the graph. The system may then determine a combined region in the visual representation of the graph as a union or an intersection of the region and the additional region. The system may then filter the representation of the graph to select a combined set of vertices visually represented within the combined region, and edges connecting vertices in the combined set.

In a variation on this embodiment, in order to define the local graph filter, the system may receive, from the user via a pointing device, a boundary delimiting the region in the visual representation of the graph.

In a variation on this embodiment, the local graph filter may specify a set of constraints. The system may then further filter the subset of vertices visually represented within the region to select vertices satisfying the constraints, and edges connecting the selected vertices.

In a variation on this embodiment, the system may display, for the user, a slider control associated with the local graph filter that represents a property of vertices in the graph. The system may then receive a value for the property from the user via a pointing device and according to a position of the slider control. The system may then set a respective constraint based on the received value for the property.

In a variation on this embodiment, a respective constraint defines a range of values for one or more of: a degree of a respective vertex in the graph; a number of triangles associated with a respective vertex in the graph; a number of cliques associated with a respective vertex in the graph; a number of graphlets associated with a respective vertex in the graph; a k-core number of a respective vertex in the graph; a measure of graph distance of a respective edge in the graph; and a measure of graph connectivity of a respective vertex in the graph.

In a variation on this embodiment, a respective vertex in the graph is associated with auxiliary properties, and a respective constraint defines a range of values for an auxiliary property of the respective vertex.

In a variation on this embodiment, a respective vertex in the graph is associated with auxiliary properties. A respective vertex in the graph can represent a person, and the auxiliary property can include one or more of: an age of the person; a political view of the person; a gender of the person; an education level of the person; a wealth or income level of the person; a geographic location of the person; a household size associated with the person; and a purchase history of the person.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of facilitating complex graph queries by applying localized filters to a visual representation of the graph. Thus, the system enables complicated graph query operations to be performed visually with ease and makes graphs easier to visualize, understand and explore. For instance, the system enables users to formulate complex and non-intuitive graph queries, which are localized to a subset or region of the graph, instead of defined on the entire graph itself. During operation, the system can obtain data indicating vertices and edges of a graph. The system can then display a visual representation of the graph for a user and receive, from the user, a command defining a local graph filter, which comprises a region in the visual representation. The system can then filter a representation of the graph, and store the filtered representation.

Figure 1A:
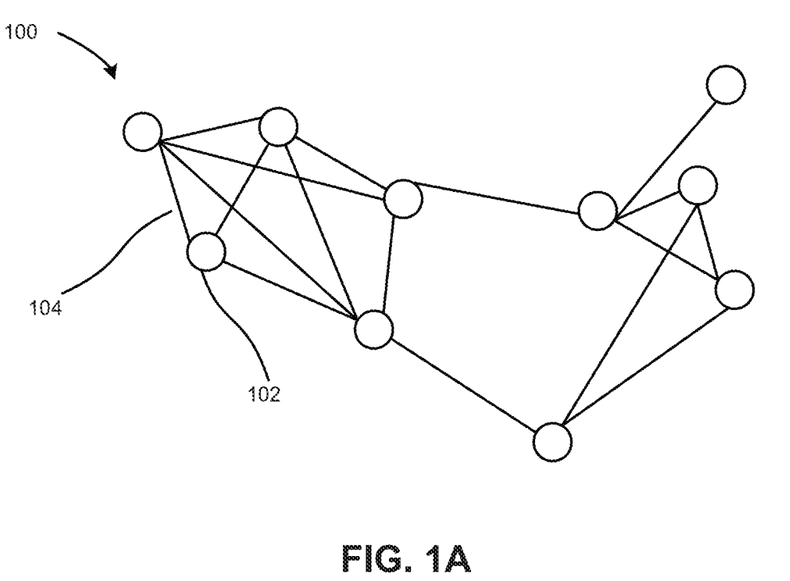
FIG. 1A illustrates an example of a visual representation of a graph.

FIG. 1A illustrates an example of a visual representation of a graph. As illustrated in FIG. 1A, a graph 100 can include vertices such as 102, also called nodes, and edges such as 104, also called links or connections. A visual representation of a graph, such as FIG. 1A, should reproduce these features accurately, for example by showing the vertices as points or circles and the edges as curves or lines connecting vertices, as in FIG. 1A. In general, because graphs are primarily concerned with topological relationships and because edges may not have an intrinsic length, there can be many different ways of representing the same graph visually. As in FIG. 1A, a visual representation may show vertices clustered in different spatial regions, which may or may not reflect a higher degree of connectedness within the clusters.

Note that in some embodiments, a graph may contain and refer to additional information beyond just the topological connections among vertices. For example, a graph may include multiple types of vertices and edges (commonly referred to as a heterogeneous graph, or multi-typed graph). A graph may also include an arbitrary number of vertex and edge attributes that can carry auxiliary information (referred to as an attributed graph, or sometimes a multi-dimensional graph). For example, the attributes may relate to people, objects, products for sale, a person's friends, a timestamp of a transaction, a check-in or other location, a person's age, etc. The graph may also contain spatial and temporal information (both on the nodes and edges).

In some embodiments, the attributes/properties used as filters or constraints may be properties derived by the system itself. For instance, in some embodiments the system may compute a matrix factorization of the graph or attributes. Then each eigenvector may itself be considered an attribute, and may be used as a basis for filtering. Also, in some embodiments the system may be used with a classification or regression method for prediction. Then the system may create an attribute based on the prediction uncertainty, or even an attribute representing the nodes/edges that were correctly/incorrectly classified, among other possibilities.

Figure 1B:
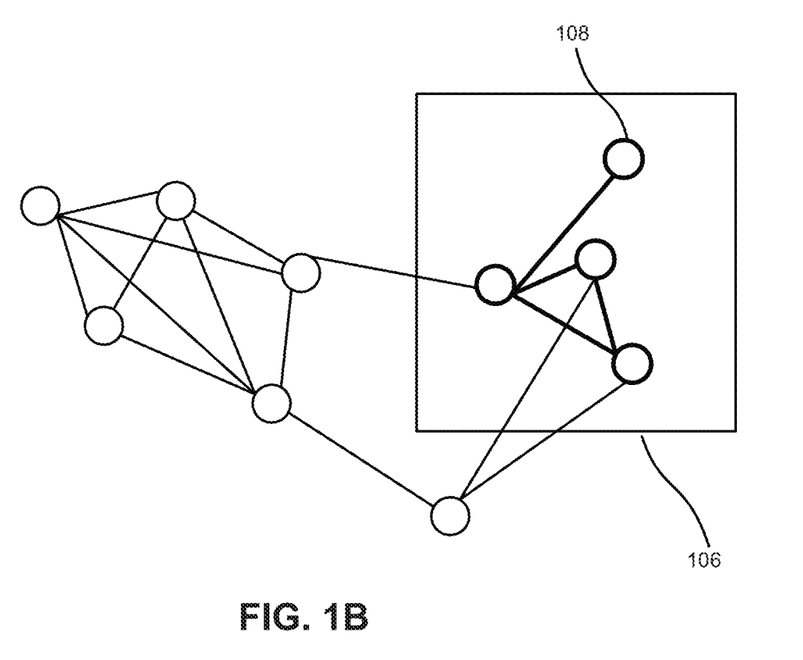
FIG. 1B illustrates an example of filtering the graph of FIG. 1A by a local graph filter or spatial region, according to embodiments of the present invention.

FIG. 1B illustrates an example of filtering the graph of FIG. 1A by a local graph filter or spatial region, according to embodiments of the present invention. As shown in FIG. 1B, box 106 delimits a spatial region which can be used to select a portion of graph 100. Note that the use of a box is an example, and spatial regions of other shapes may be used. The selection or filtering criteria, including the spatial region, are herein referred to as a local graph filter, a filter, a selector, or a control point. The term control point may also refer to a visual shortcut, such as a single point or circle, displayed to provide the user with further options relevant to a particular local graph filter. The local graph filter, including the spatial region, may be specified visually by a user with a pointing device, or may be input through other means such as file- or text-based input of coordinates. As shown in FIG. 1B, portions of the graph, such as vertex 108, that are visually represented within the region bounded by box 106 may be filtered or selected by embodiments of the present invention. This is represented by showing these portions with bold lines.

Different embodiments may determine the filtered or selected portions of the graph differently. For example, as shown in FIG. 1B, a user can select a vertex-induced subgraph with vertices contained in the specified region. Because a vertex-induced subgraph only contains edges between the vertices contained in the subgraph, some edges that are partially within box 106 are shown as unselected. In other embodiments, one may select a subgraph induced by edges within the region, or by both vertices and edges within the region. In further embodiments, one may simply select sets of vertices or edges within the region, i.e., one may select a portion of the graph that is not an induced subgraph. Some embodiments may provide more complex and user-configurable graph-selection options.

Configurable Options

In some embodiments, the system utilizes user-specified constraints, particularly in combination with a control point, to filter the graph. The system may provide visual tools such as slider controls to set these constraints, and visual representations of three-dimensional or higher-dimensional graphs and spatial regions.

In some embodiments, the system can allow a user to compose two or more control points or filters to filter the graph. In this way, the user can express very complex or subtle graph queries easily by visually specifying the control points and/or constraints. Specifically, composing two control points may result in selecting only portions of the graph satisfying both control points, or in the intersection of the two spatial regions. Alternatively, in some embodiments of the present invention, the user can select portions of the graph in the union of the two spatial regions.

Once a portion of the graph is selected or filtered, the system may store the filtered portion in memory or non-transitory storage. In some embodiments, the system may provide other options, for example displaying only the filtered portion of a graph, or highlighting the filtered portion. After a control point has been established, the system can provide further filtering options. For example, a control point may be moved such that the spatial region encloses a different portion of the graph, thereby changing the filtered portion of the graph. Alternatively, moving the control point could result in moving the selected portion of the graph within the visual representation. In some embodiments, the system can display pertinent graph statistics of the filtered portion of a graph, or selected subgraph, after a control point has been set. For example, the system may display the number of vertices, number of edges, density, average or range of vertex degree, average or range of number of triangles or cliques per vertex, clustering, k-core number, measures of graph distance, etc. The system can also allow the user to add or modify constraints, for example by clicking a control point or adjusting a slider control, after a control point has been set.

System Architecture

Figure 2:
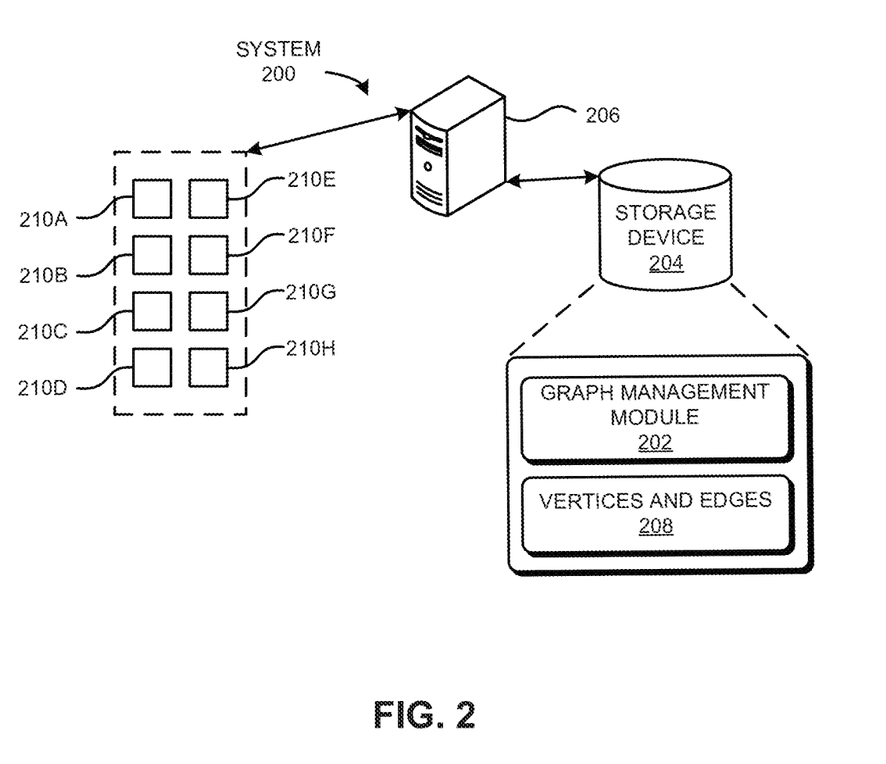
FIG. 2 presents a block diagram illustrating an exemplary architecture of a graph computation system utilizing the graph querying and filtering method, according to embodiments of the present invention.

FIG. 2 presents a block diagram illustrating an exemplary architecture of a graph computation system 200 utilizing the graph querying method, according to an embodiment of the present invention. A graph computation system 200 may divide the vertices of a graph and perform queries on a graph, in parallel with multiple processors. In conventional systems, system 200 would require a user to write a script to perform graph queries. However, using the methods disclosed herein, system 200 enables the user to perform complicated graph query operations with ease visually.

Graph computation system 200 may include a graph management module 202 installed on a storage device 204 coupled to a server 206. Note that various implementations of the present invention may include any number of servers and storage devices. In various implementations, graph management module 202 may include a graph-filtering module or other components of graph computation system 200 to perform the techniques described herein. System 200 may receive data describing vertices and edges, and store such data in storage device 204. System 200 may read the code for graph management module 202 and the data for vertices and edges 208 from storage device 204. System 200 may divide graphs or subgraphs, and assign them to processors, such as processors 210A-210H, which operate on the assigned graphs or subgraphs.

Method for Querying a Graph With Localized Filters

Figure 3:
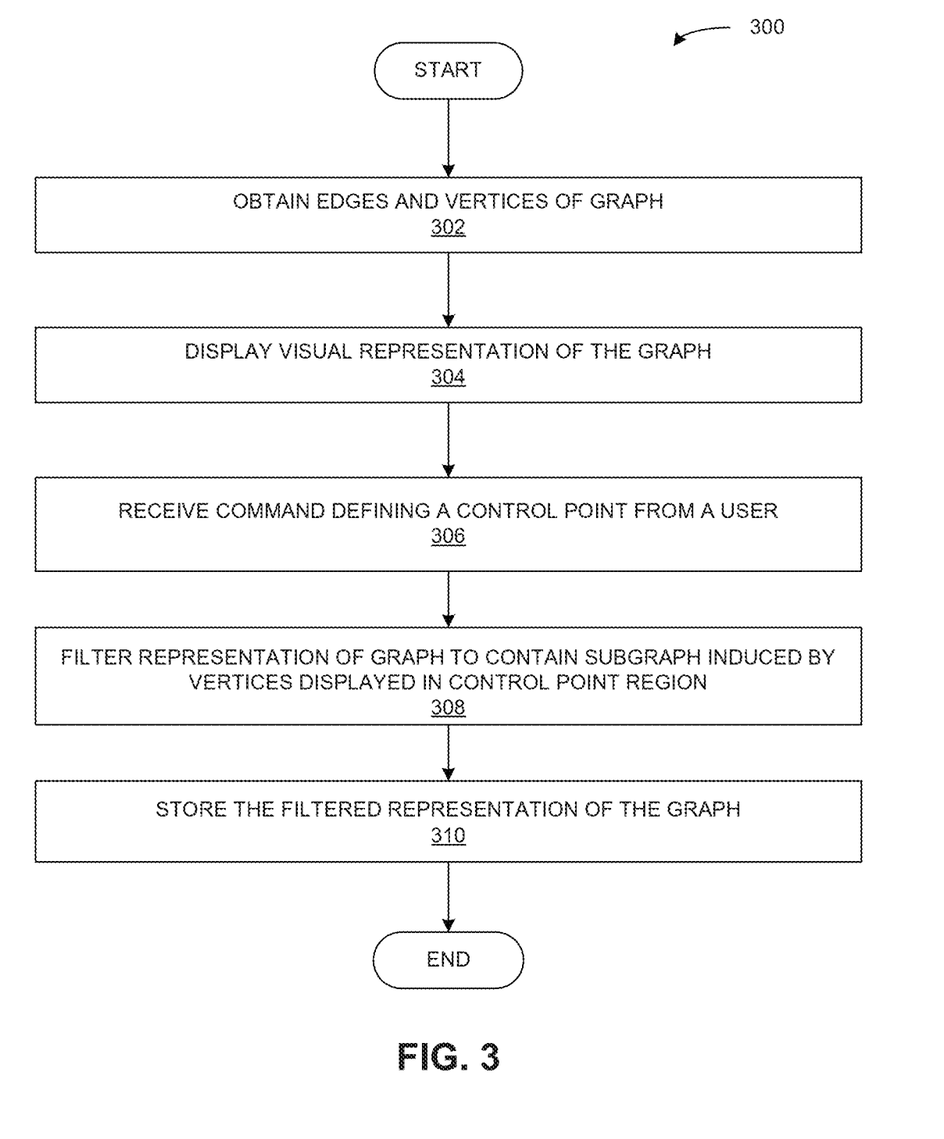
FIG. 3 presents a block diagram illustrating a method for querying a graph according to embodiments of the present invention.

FIG. 3 presents a flowchart 300 illustrating a method to query a graph based on localized filters, according to embodiments of the present invention. During operation, the system obtains data indicating vertices and edges of a graph (operation 302). The system then displays a visual representation of the graph for a user (operation 304). The system may then receive, from the user, a command defining a control point or local graph filter comprising a region in the visual representation (operation 306).

Next, the system may filter a representation of the graph to contain a subgraph induced by vertices displayed in the region specified by the control point (operation 308). In some embodiments, the filtered representation may contain a subgraph induced by edges displayed in the region. In other embodiments, the filtered representation may simply contain vertices or edges displayed in the region, rather than a subgraph.

Finally, the system may store the filtered representation (operation 310). In some embodiments, the system may highlight the filtered portion of a graph, or alternatively, display only the filtered portion. The system may also enable the user to move a control point, thereby changing the filtered portion of the graph. Furthermore, the system can display pertinent graph statistics of the filtered portion of a graph, or selected subgraph, after a control point has been set. The system can allow the user to add or modify constraints, for example by clicking a control point or adjusting a slider control, after a control point has been set.

Combining Localized Filters

Embodiments of the present invention allow the user to define multiple localized filters simultaneously, thus specifying multiple regions in the visual representation of the graph. These multiple regions may differ from each other in size, shape, location, and constraint criteria. The system may provide an 'add control point' visual button control, a shortcut, a voice command, or another control to allow the user to create a new localized graph filter expeditiously.

Multiple localized filters may be present in a single graph without interacting. In some embodiments, a region associated with a localized graph filter may appear highlighted when the local graph filter (or its control point) is actively selected by a user, for example by clicking or pointing with a pointing device. In some embodiments, the region in the visual representation may be hidden, for example by clicking the control point again, or by pointing outside the region with a pointing device. In addition, to reduce visual cluttering, statistics, constraints, or other pertinent information about a localized filter or its associated portion of the graph may be hidden when not actively used. For example, a respective local graph filter (and its visual representation, GUI controls, etc.) may reduce to a single point (called the control point), which may be located at the center of the region (and displayed as such). The information may then be displayed, for example, when the user clicks on the control point or points to it with a pointing device.

In some embodiments, the system can allow the user to combine localized filters such that their filtering functions do interact, i.e., they act together as a single filter. For example, the system may allow a user to combine or compose two or more control points or filters to filter the graph. Combining or composing filters may allow the user to express very complex or subtle graph queries easily by visually specifying the control points and/or constraints.

Figure 4A:
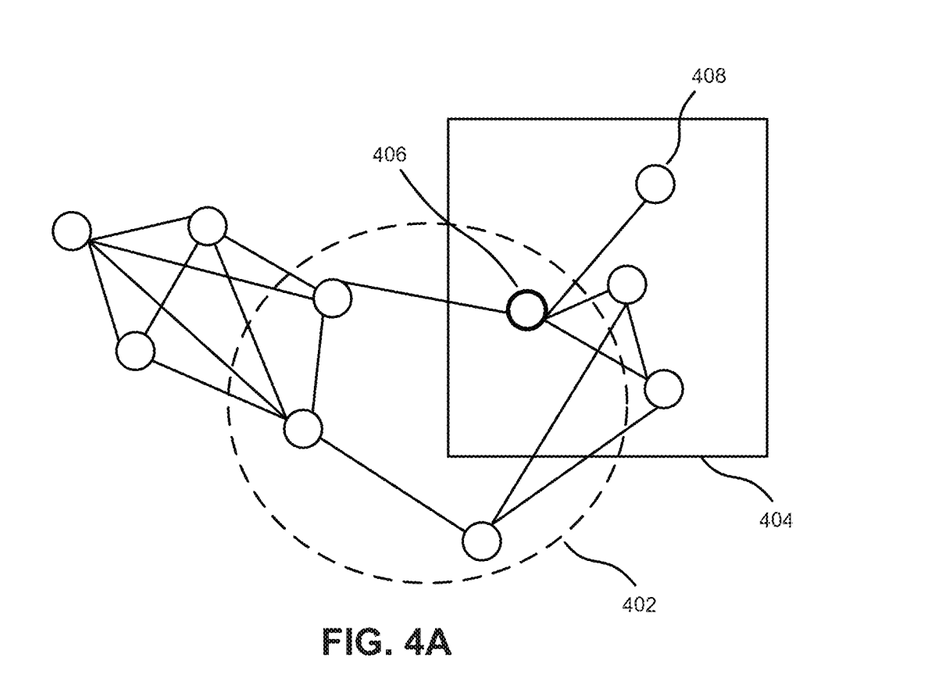
FIG. 4A illustrates an example of filtering the graph of FIG. 1A by a combination involving an intersection of two spatial regions, according to embodiments of the present invention.

FIG. 4A illustrates an example of filtering graph 100 by a combination involving an intersection of two spatial regions, according to embodiments of the present invention. As illustrated in FIG. 4A, composing two localized graph filters may result in selecting only portions of the graph that satisfy both localized filters, or equivalently, lie in the intersection of the two spatial regions. As shown in the figure, regions 402 and 404 may be different shapes and may be centered on different portions of the graph. Composing regions 402 and 404 via their intersection results in selecting only vertex 406, because this is the only vertex contained within both regions 402 and 404. By contrast, vertex 408, which is displayed within region 404 but not region 402, is not selected. Furthermore, since no edge in FIG. 4A connects two vertices that are both within the intersection of the regions, no edges are selected in the figure. For example, the edge connecting vertices 406 and 408 is not selected, as shown.

Figure 4B:
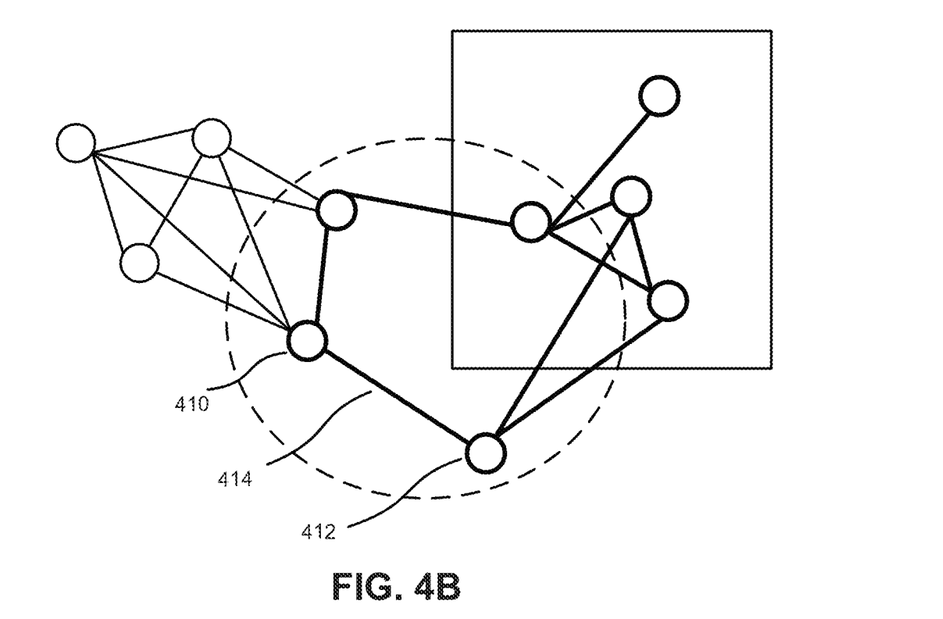
FIG. 4B illustrates an example of filtering the graph of FIG. 1A by a combination involving a union of two spatial regions, according to embodiments of the present invention.

Alternatively, as illustrated in FIG. 4B, the system may allow a user to select portions of the graph in the union of the two spatial regions. FIG. 4B illustrates an example of filtering graph 100 by a combination involving a union of two spatial regions, according to embodiments of the present invention. FIG. 4B illustrates the same graph and same spatial regions as in FIG. 4A. However, in this case, all vertices displayed within either region 402 or 404 are selected. For example, vertices 410 and 412, which are contained within region 402 but not within region 404, are selected. Likewise, edge 414, which connects vertices 410 and 412, is selected.

Note that FIGS. 4A and 4B show filtering results as subgraphs induced by the vertices in the combined spatial regions. That is, vertices are selected based on the spatial regions and any other filter criteria, whereas edges are selected if and only if they connect selected vertices. However, in some embodiments, the system may make use of other selection criteria. For example, the system may use edge-induced subgraphs as the filtering results. In other embodiments, the system may make use of more complex selection rules, for example requiring a selected vertex to have at least one selected neighbor.

Localized Graph Filters With Constraints

In addition to filtering a graph based on portions of the graph displayed within a spatial region, some embodiments of the present invention allow a user to define constraints $\{f_i\}$ on the filtered graph. A constraint may require that a function take on a numerical value, such as $f_i=0$. Here $f_i$ can be some property, or function of the properties, of the vertices and/or edges of a graph, subgraph, or portion of a graph: schematically, $f_i=f_i(V, E)$. For example, if $f_i=\deg(V)-6$, where $\deg(V)$ denotes the degree of the vertices displayed within a spatial region, then the constraint $f_i=0$ would select the vertices within the region having a degree of 6. Alternatively, a constraint may set maximum or minimum values, for example $f_i>3$ and $f_i\leq5$.

Like spatial regions, constraints may also be composed, for example using logical operators like AND and OR. Then, for example, a composition via AND of a set $F=\{f_1, \ldots, f_j\}$ of constraints: $f_1$ AND ... AND $f_i$ ... AND $f_j$, would require all the constraints in the set F to be simultaneously satisfied. Alternatively, more subtle and flexible compositions of constraints may be built using nested combinations of AND and OR.

Constraints may be specified in the form of equations or in words. Constraints may be selected from preset options, such as a menu, with variable parameters, or they may be defined more flexibly, such as by a specialized input language. Constraints and the associated variables may also be set by visual user tools, such as slider controls, drop-down menus, or buttons.

Figure 5A:
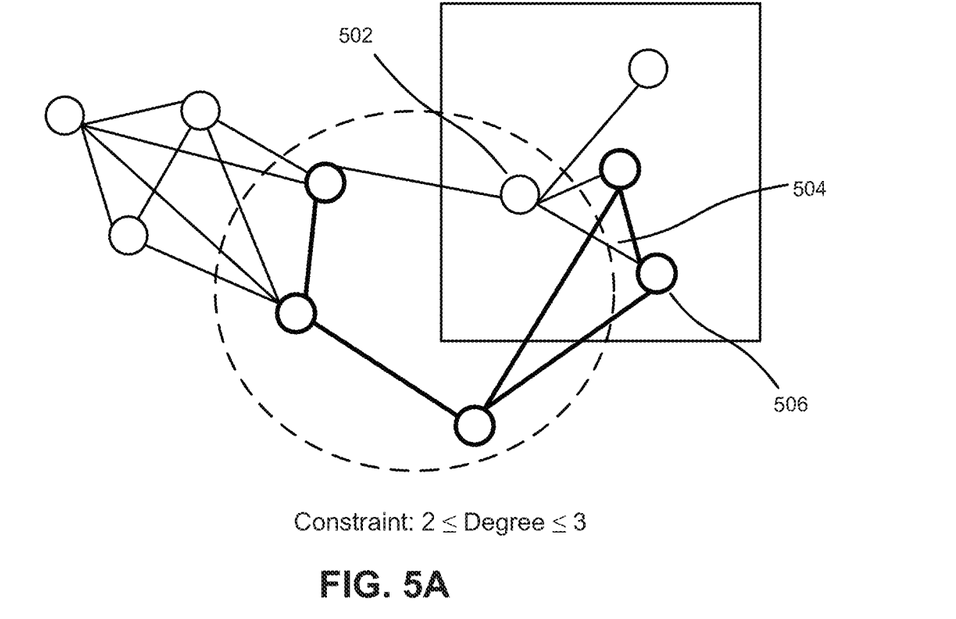
FIG. 5A illustrates an example of the graph filter according to FIG. 4B, also incorporating a constraint on vertex properties, according to embodiments of the present invention.

FIG. 5A illustrates an example of graph 100 filtered according to a union of spatial regions as in FIG. 4B, and additionally incorporating a constraint on vertex properties, according to embodiments of the present invention. A constraint may be displayed visually in the representation of the graph, for example by text and/or equations near the control point. For example, as shown in FIG. 5A, a user may specify both a minimum allowed degree of 2 and maximum allowed degree of 3. This results in only vertices with degrees of 2 or 3 being selected by the filter. As shown in FIG. 5A, vertex 502 with a degree of 4 is not selected, although it meets the minimum degree constraint, because it fails the maximum-degree constraint. Because vertex 502 is not selected, edge 504 which connects vertex 502 to vertex 506 is also not selected, even though vertex 506 is selected. Note that in FIG. 5A, degree can be defined the standard way, without regard for whether a vertex's neighbors are located in the spatial region or themselves satisfy the filtering constraints. However, in some embodiments, the system may determine degree or other graph properties in a self-consistent way, such as counting as neighbors only vertices that themselves satisfy the filter.

Figure 5B:
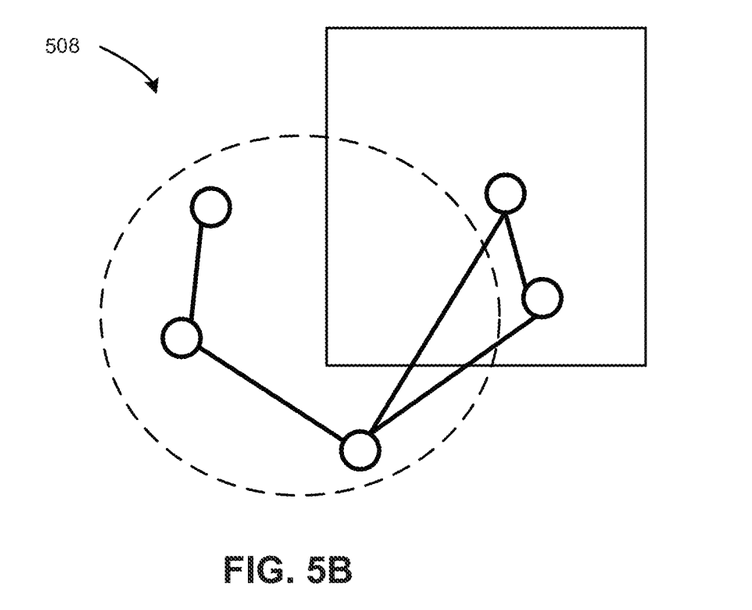
FIG. 5B illustrates a visual representation of the filtered graph of FIG. 5A, according to embodiments of the present invention.

FIG. 5B shows the filtered graph 508 resulting from FIG. 5A with the constraint applied. As shown in the figure, some embodiments of the invention may display only the filtered portion of the graph, or subgraph. After application of the localized graph filter, the system may store the filtered portion or subgraph to a non-transitory storage device. The system may also serve the filtered portion or subgraph as a query result, and use this query result as input into a graph computation or other analysis.

Exemplary topological graph properties that may be referenced by the constraints include: vertex degree, number of triangles to which a vertex belongs, number of k-cliques (i.e. cliques with k members) to which a vertex belongs, total number of cliques to which a vertex belongs, clustering, k-core number, measures of graph distance, etc. In some embodiments, a graph may contain and refer to additional information beyond just topological ones. For example, a graph may include multiple types of vertices and edges (commonly referred to as a heterogeneous graph, or multi-typed graph). Other properties may include temporal and spatial dependencies (both on the graph's nodes and edges), and bi-partite or more generally k-partite graph properties.

In some embodiments, a graph may specify auxiliary properties for the vertices or edges, in order to carry or represent additional information. For example, the graph's vertices may represent people, objects, products for sale, transactions, etc., and the graph may specify auxiliary properties such as a person's friends, a timestamp of a transaction, a person's check-in or other location, a person's age or political views, etc. Such auxiliary properties will also be referred to as attributes, and a graph specifying auxiliary properties as an attributed graph or a multivariate graph.

The system can specify constraints relating to auxiliary properties of the vertices or edges. For example, a constraint may specify that a selected vertex must represent a person between the ages of 18 and 27. A constraint may also relate to a constructed feature, such as a combination of topological and auxiliary properties of vertices or edges. For example, a constraint may specify that a vertex must belong to a 4-clique of people with similar political views. Such filtering constraints allow a user to perform subtle queries easily, to uncover useful relationships in networks representing important applications.

In general, the properties and/or attributes that can be used as filters can be related to the graph, or can be properties and/or attributes not directly related to the nodes and edges of the graph. For example, the properties and/or attributes can be external node and edge attributes such as "timestamp of last transaction," "last location that an individual checked in/was located," or "age of an individual," etc. In some embodiments, the attributes used as filters or constraints may also be properties derived by the system itself. For instance, in a matrix factorization of the graph or attributes, the eigenvectors may be considered attributes and used as a basis for filtering. In some embodiments the system may be used with classification or regression for prediction. Then the system may create attributes based on the prediction uncertainty, or even attributes representing the nodes/edges that were correctly/incorrectly classified, among other possibilities.

In some embodiments, the attributes may be relational, and the constraints may refer to relational attributes. In other embodiments, the attributes may be non-relational.

Visual Controls for Filter Constraints

Figure 6A:
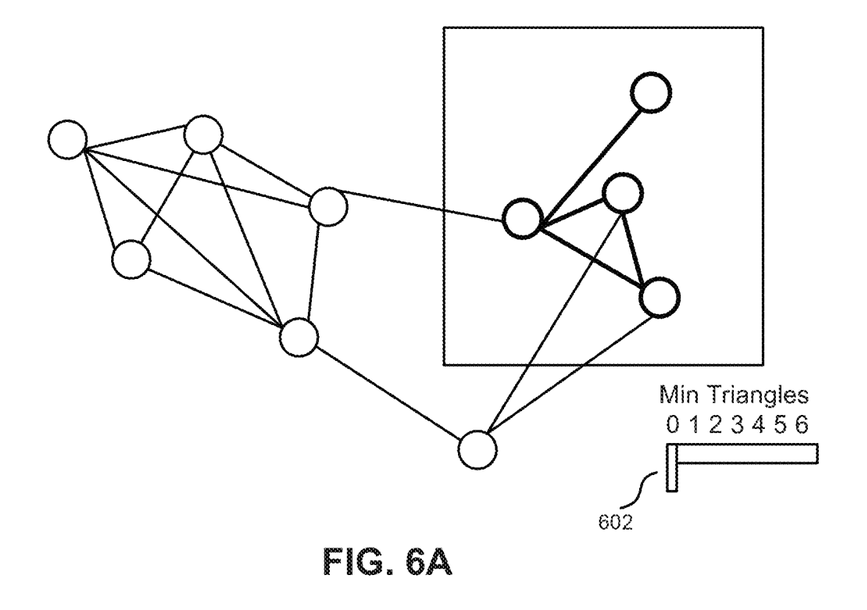
FIG. 6A illustrates specifying constraints via a slider control to filter a graph according to embodiments of the present invention.

Some embodiments of the present invention may provide visual tools such as slider controls, drop-down menus, or buttons to set constraints. Some embodiments allow the user to add constraints, for example by clicking a control point displayed on an existing local graph filter. FIG. 6A illustrates filtering a graph via constraints specified with a visual slider control, according to embodiments of the present invention. FIG. 6A shows graph 100 and the localized graph filter of FIG. 1B. However, in addition to the spatial region 106 shown in FIG. 1B, the graph in FIG. 6A is also filtered by a constraint on the minimum number of triangles. A triangle is a clique, or fully-connected subgraph, with three vertices. Therefore, the constraint illustrated in FIG. 6A requires that a vertex be a member of at least the minimum number of triangles, in order to be selected.

As shown in FIG. 6A, in some embodiments, the system allows the user to specify parameters of constraints, such as the minimum number of triangles, via visual tools such as slider controls. As shown, slider 602 is set to the value 0, indicating a minimum of 0 triangles. This is equivalent to no additional constraint on the vertices. Therefore, the graph is filtered only by the spatial region, and as shown, the same subgraph is selected as in FIG. 1B.

Figure 6B:
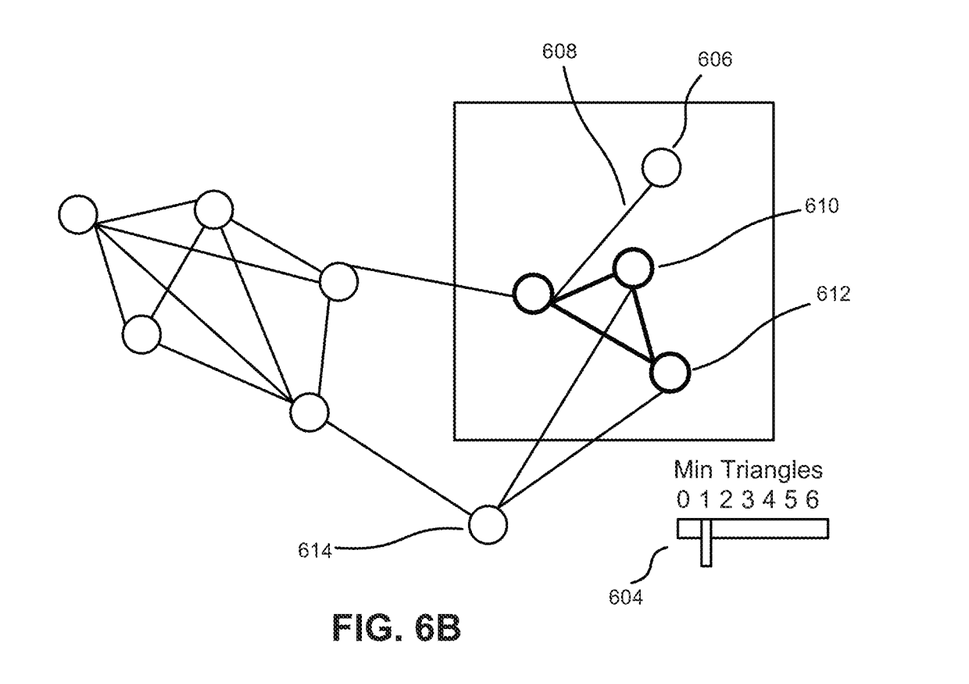
FIG. 6B illustrates the effect of changing the slider control of FIG. 6A to filter a graph according to embodiments of the present invention.

FIG. 6B illustrates the same graph and constraint, with the slider control adjusted to a different value. Here, slider 604 is set to the value 1. Therefore, the constraint illustrated in FIG. 6B requires that a vertex be a member of at least one triangle, in order to be selected. As a result of this change in the slider value, vertex 606 is not selected in FIG. 6B, although it is selected in FIG. 6A, because it belongs to no triangles. Likewise, edge 608 is not selected because it connects to vertex 606. However, vertices 610 and 612, which belong to the same triangle, are selected.

Note that vertices 610 and 612 belong to two triangles, one of which lies entirely inside the spatial region 106. Vertex 614, which forms a second triangle with vertices 610 and 612, lies outside region 106 and therefore is not selected. In some embodiments, the vertex or edge properties referenced by constraints are computed with respect to the entire graph, so vertex 610 would belong to two triangles, for example. But in other embodiments, the properties may be computed with respect to the portion of the graph within the spatial region, so, for example, vertex 610 would have a triangle count of one. In some embodiments, the properties may be computed self-consistently with respect to the localized graph filter including the constraints.

Higher-Dimensional Graph Visualizations and Localized Filters

Figure 7:
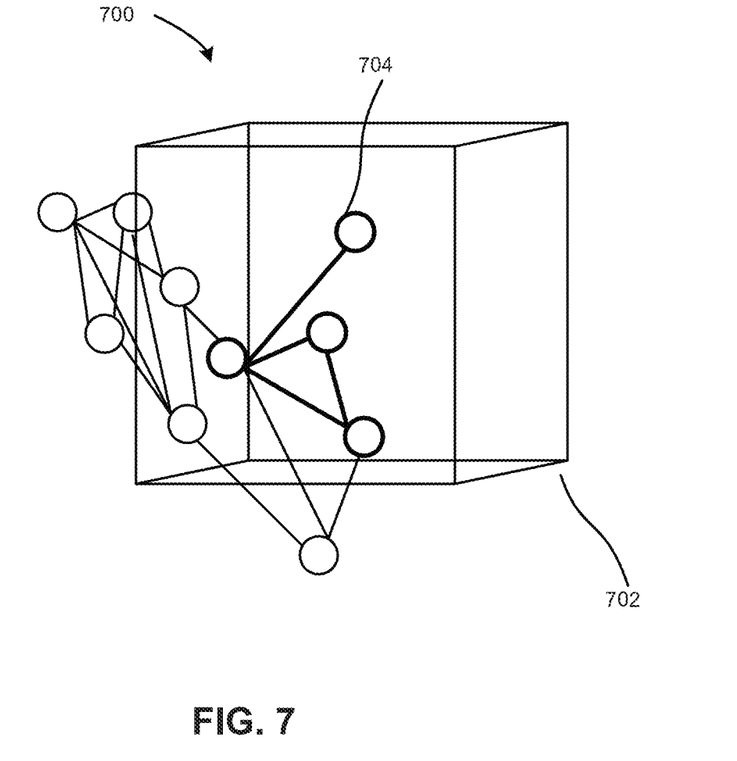
FIG. 7 illustrates an example of filtering a multi-dimensional graph by a multi-dimensional spatial region, according to embodiments of the present invention.

In some embodiments, the representation of a graph is three- or higher-dimensional. Displaying three- or higher-dimensional visualizations of a graph enables embodiments of the invention to show detailed information about complex graphs more clearly and in greater depth than strictly two-dimensional visualizations. FIG. 7 illustrates an example of filtering a multi-dimensional graph by a multi-dimensional spatial region, according to embodiments of the present invention. This example shows a three-dimensional representation 700 of a graph, together with a three-dimensional region 702 used to formulate a localized graph filter. As can be seen in the figure, vertex 704 is displayed within three-dimensional region 702, and therefore is selected in the filtered representation of the graph. Although region 702 is shown as a cube, other three-dimensional solids, such as spheres, ellipsoids, polyhedra, etc. may also be used.

Although the system can display the visual representation of the graph on a two-dimensional display or screen, the system may still use perspective or oblique views or projections to show a three- or even higher-dimensional representation of the graph, as in FIG. 7. Such views enable a user to determine by visual inspection whether a portion of a graph is located within the spatial region of a local graph filter. The system may also allow the user to rotate, pan, and zoom the view in the visual representation in order to visualize portions of the graph more clearly, particularly in multi-dimensional visualizations. The system may make use of other types of display or related technologies in order to visualize three- or higher-dimensional graphs, for example a holographic projection, stereogram, or other three-dimensional display. Animation may also be used to step through one or more dimensions of a visualization, thereby reducing the number of dimensions needed to be visualized per frame. Moreover, graph visualizations with dimension higher than three may also be shown, for example by displaying two- or three-dimensional projections of a higher-dimensional visualization.

Exemplary Apparatus

Figure 8:
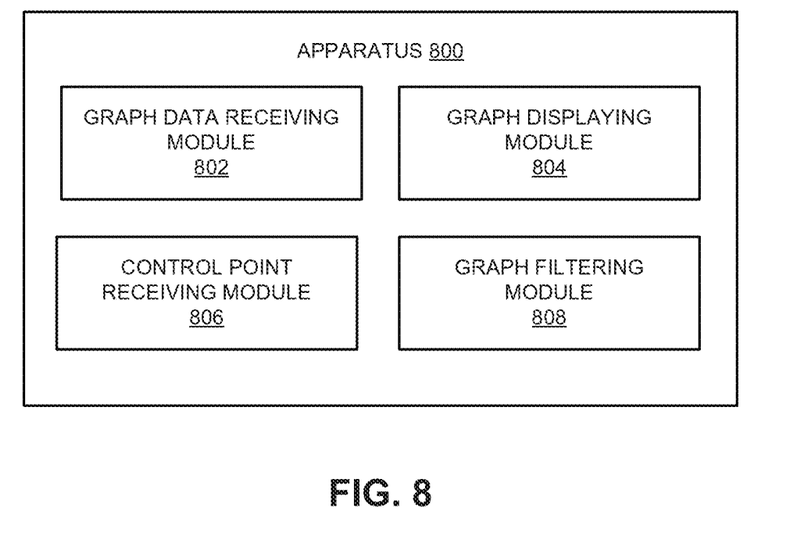
FIG. 8 presents a block diagram illustrating an exemplary apparatus for graph querying, in accordance with embodiments of the present invention.

FIG. 8 presents a block diagram illustrating an exemplary apparatus 800 that facilitates visual graph querying and local filtering, in accordance with some embodiments. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a graph data-receiving module 802, a graph-displaying module 804, a control point-receiving module 806, and a graph-filtering module 808. Note that apparatus 800 may also include additional modules not depicted in FIG. 8.

In some embodiments, graph data-receiving module 802 can receive data comprising a representation of vertices and edges of a graph. Graph-displaying module 804 may display a two- or higher-dimensional visual representation of the graph. Control point-receiving module 806 may receive a user command defining a local graph filter, comprising a spatial region in the graph visualization and any constraints. Graph-filtering module 808 may filter the graph according to the local graph filter received by control point-receiving module 806, and by any constraints specified, and may display or store the filtered representation of the graph. Note that graph management module 202 illustrated in FIG. 2 may provide any and all functions of the various modules depicted in FIG. 8.

Exemplary System

Figure 9:
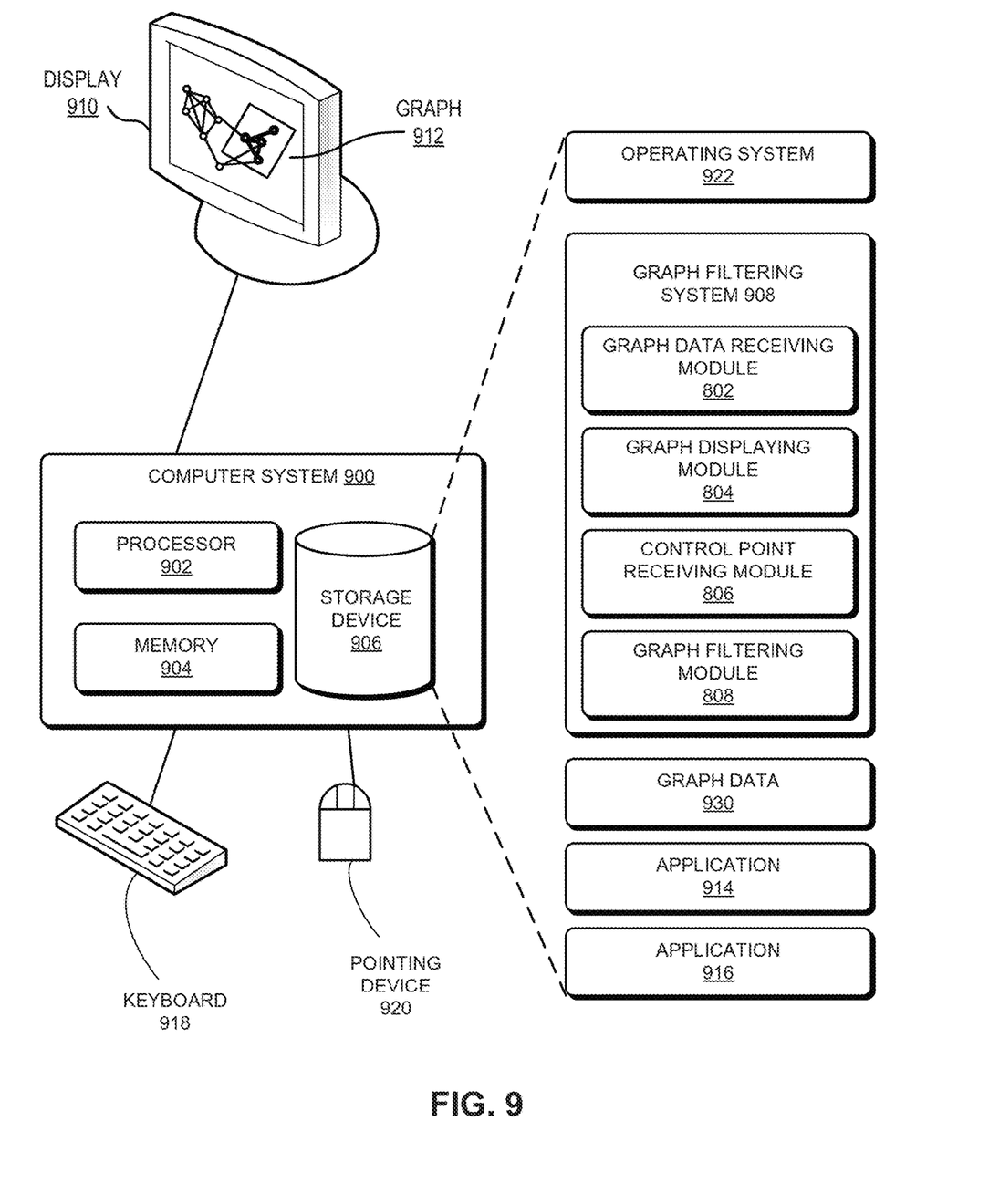
FIG. 9 presents a block diagram illustrating an exemplary computer system for graph querying, in accordance with embodiments of the present invention.

FIG. 9 illustrates an exemplary graph querying and filtering computer system 900, in accordance with some embodiments. In some embodiments, computer system 900 may be a server. In some embodiments, system 900 includes a processor 902, a memory 904, and a storage device 906. In some embodiments, 902 may include a set of processors. Storage device 906 may store a number of applications, such as applications 914 and 916, which may make use of graph querying according to embodiments of the present invention, or of the associated query results, and operating system 922. Storage device 906 also stores graph filtering system 908 that includes a graph data-receiving module 802, a graph-displaying module 804, a control point-receiving module 806, and a graph-filtering module 808. System 900 and/or graph data-receiving module 802 may receive or generate graph data 930 comprising vertices and edges data and may copy graph data to a memory section accessible to graph filtering system 908. During operation, one or more applications, such as graph filtering system 908, are loaded from storage device 906 into memory 904 and then executed by processor set 902. While executing the program, processor set 902 performs the aforementioned functions. System 900 may be coupled to a display 910 that may display graph visualizations such as graph 912, a keyboard 918, and a pointing device 920.

In some embodiments, graph data-receiving module 802 can receive data comprising a representation of vertices and edges of a graph. Graph-displaying module 804 may display a two- or higher-dimensional visual representation of the graph. Control point-receiving module 806 may receive a user command defining a local graph filter, comprising a spatial region in the graph visualization and any constraints. Graph-filtering module 808 may filter the graph according to the local graph filter received by control point-receiving module 806, and by any constraints specified, and may display or store the filtered representation of the graph. Note that graph management module 202 illustrated in FIG. 2 may provide any and all functions of the various modules depicted in FIG. 9.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for data processing based on a graph, comprising:
   obtaining, by a computer system comprising a set of processors, a data set represented as a graph comprising vertices and edges;
   displaying, for a user, a visual representation of the graph in a graphical user interface (GUI) provided by the computer system;
   receiving, from the user, a control point in the GUI that defines a local graph filter by indicating a local region in the visual representation of the graph in the GUI by defining, via the control point in the GUI, a boundary of the local region, wherein the local graph filter spatially restricts graph operations to the local region;
   receiving, from the user, a topological constraint for further filtering the local region in the visual representation from a constraint selector in the GUI;
   filtering the graph to select a subset of vertices, which are visually represented within the local region and conform to the constraint, and a subset of edges connecting the subset of vertices;
   displaying the filtered subsets of edges and vertices of the graph so as to distinguish the filtered from the displayed non-filtered portion of the graph; and
   storing a subset of the data set represented by the subset of vertices and the subset of edges in a non-transitory storage medium.

2. The method of claim 1, further comprising:
   receiving, from the user, a second local graph filter indicating a second local region in the visual representation of the graph;
   determining a combined region in the visual representation of the graph as a union or an intersection of the local region and the second local region; and
   filtering the graph to select a combined set of vertices visually represented within the combined region, and a combined set of edges connecting vertices in the combined set.

3. The method of claim 1, wherein the control point indicates a boundary delimiting the local region in the visual representation of the graph.

4. The method of claim 1, wherein filtering the graph comprises selecting vertices satisfying the constraint and edges connecting the selected vertices.

5. The method of claim 1, wherein the constraint selector is a slider control associated with the local graph filter and indicates a property of vertices in the graph; and
   wherein the method further comprises:
      receiving, based on a position of the slider control, a value for the property; and
      setting the constraint for the local region in the visual representation based on the received value for the property.

6. The method of claim 1, wherein the constraint indicates a range of values for one or more of:
- a degree of a respective vertex in the graph;
- a number of triangles associated with a respective vertex in the graph;
- a number of cliques associated with a respective vertex in the graph;
- a number of graphlets associated with a respective vertex in the graph;
- a k-core number of a respective vertex in the graph;
- a measure of graph distance of a respective edge in the graph; and
- a measure of graph connectivity of a respective vertex in the graph.

7. The method of claim 1, wherein a respective vertex in the graph is associated with auxiliary properties, and the constraint indicates a range of values for an auxiliary property of the subset of vertices in the local region in the visual representation.

8. The method of claim 7, wherein the auxiliary property includes one or more of:
- an age of a person;
- a wealth or income level of a person;
- a geographic location of a person;
- a purchase history of a person;
- a person's friends or social network;
- a time of a transaction;
- an amount of a transaction;
- spatial or temporal information of a commercial activity;
- a derived property of the graph;
- a property obtained from a matrix factorization of the graph;
- an attribute based on a classification or regression method for prediction in the graph; and
- an attribute representing whether a vertex or edge has been correctly classified.

9. A non-transitory computer-readable storage medium storing instructions that when executed by a computer cause the computer to perform a method for data processing based on a graph, the method comprising:
- obtaining, by the computer, a data set represented as a graph comprising vertices and edges;
- displaying, for a user, a visual representation of the graph in a graphical user interface (GUI) provided by the computer;
- receiving, from the user, a control point in the GUI that defines a local graph filter by indicating a local region in the visual representation of the graph in the GUI by defining, via the control point in the GUI, a boundary of the local region, wherein the local graph filter spatially restricts graph operations to the local region;
- receiving, from the user, a topological constraint for further filtering the local region in the visual representation from a constraint selector in the GUI;
- filtering the graph to select a subset of vertices, which are visually represented within the local region and conform to the constraint, and a subset of edges connecting the subset of vertices;
- displaying the filtered subsets of edges and vertices of the graph so as to distinguish the filtered from the displayed non-filtered portion of the graph; and
- storing a subset of the data set represented by the subset of vertices and the subset of edges in a non-transitory storage medium.

10. The computer-readable storage medium of claim 9, wherein the method further comprises:
- receiving, from the user, a second local graph filter indicating a second local region in the visual representation of the graph;
- determining a combined region in the visual representation of the graph as a union or an intersection of the local region and the local second region; and
- filtering the graph to select a combined set of vertices visually represented within the combined region, and a combined set of edges connecting vertices in the combined set.

11. The computer-readable storage medium of claim 9, wherein filtering the graph comprises selecting vertices satisfying the constraint and edges connecting the selected vertices.

12. The computer-readable storage medium of claim 9, wherein the constraint selector is a slider control associated with the local graph filter and indicates a property of vertices in the graph; and
wherein the method further comprises:
- receiving, based on a position of the slider control, a value for the property; and
- setting the constraint for the local region in the visual representation based on the received value for the property.

13. The computer-readable storage medium of claim 9, wherein a respective vertex in the graph is associated with auxiliary properties, and the constraint indicates a range of values for an auxiliary property of the subset of vertices in the local region in the visual representation.

14. The computer-readable storage medium of claim 13, wherein the property includes one or more of:
- an age of a person;
- a wealth or income level of a person;
- a geographic location of a person;
- a purchase history of a person;
- a person's friends or social network;
- a time of a transaction;
- an amount of a transaction;
- spatial or temporal information of a commercial activity;
- a derived property of the graph;
- a property obtained from a matrix factorization of the graph;
- an attribute based on a classification or regression method for prediction in the graph; and
- an attribute representing whether a vertex or edge has been correctly classified.

15. A computing system, the system comprising:
a set of multiple processors, and
a non-transitory computer-readable medium coupled to the set of processors having instructions stored thereon that, when executed by the set of processors, cause the set of processors to perform a method for data processing based on a graph, the method comprising:
- obtaining a data set represented as a graph comprising vertices and edges;
- displaying, for a user, a visual representation of the graph in a graphical user interface (GUI) provided by the computer system;
- receiving, from the user, a control point in the GUI that defines a local graph filter by indicating a local region in the visual representation of the graph in the GUI by defining, via the control point in the GUI, a boundary of the local region, wherein the local graph filter spatially restricts graph operations to the local region;
- receiving, from the user, a topological constraint for further filtering the local region in the visual representation from a constraint selector in the GUI;

filtering the graph to select a subset of vertices, which are visually represented within the local region and conform to the constraint, and a subset of edges connecting the subset of vertices;

displaying the filtered subsets of edges and vertices of the graph so as to distinguish the filtered from the displayed non-filtered portion of the graph; and storing a subset of the data set represented by the subset of vertices and the subset of edges in a non-transitory storage medium.

16. The computing system of claim 15, wherein the method further comprises:

receiving, from the user, a second local graph filter indicating a second local region in the visual representation of the graph;

determining a combined region in the visual representation of the graph as a union or an intersection of the local region and the local second region; and filtering the graph to select a combined set of vertices visually represented within the combined region, and a combined set of edges connecting vertices in the combined set.

17. The computing system of claim 15, wherein filtering the graph comprises selecting vertices satisfying the constraint and edges connecting the selected vertices.

18. The computing system of claim 15, wherein the constraint selector is a slider control associated with the local graph filter and indicates a property of vertices in the graph; and wherein the method further comprises:

receiving, based on a position of the slider control, a value for the property; and setting the constraint based on the received value for the property.

19. The computing system of claim 15, wherein a respective vertex in the graph is associated with auxiliary properties, and the constraint indicates a range of values for an auxiliary property of the subset of vertices in the local region in the visual representation.

20. The computing system of claim 19, wherein the auxiliary property includes one or more of:

an age of a person;
a wealth or income level of a person;
a geographic location of a person;
a purchase history of a person;
a person's friends or social network;
a time of a transaction;
an amount of a transaction;
spatial or temporal information of a commercial activity;
a derived property of the graph;
a property obtained from a matrix factorization of the graph;
an attribute based on a classification or regression method for prediction in the graph; and
an attribute representing whether a vertex or edge has been correctly classified.

* * * * *